United States Patent

[11] 3,617,562

| [72] | Inventors | Allen Cywin<br>Alexandria, Va.;<br>Edward A. Mihok, Pittsburgh, Pa. |
|---|---|---|
| [21] | Appl. No. | 35,866 |
| [22] | Filed | May 8, 1970 |
| [45] | Patented | Nov. 2, 1971 |
| [73] | Assignee | The United States of America as represented by the Secretary of the Interior |

[54] NEUTRALIZATION OF FERROUS IRON-CONTAINING ACID WASTES
16 Claims, 3 Drawing Figs.

[52] U.S. Cl. .................................................. 210/48, 23/61, 23/154, 23/200, 210/50, 210/61
[51] Int. Cl. .................................................. C02c 5/04
[50] Field of Search ........................................... 210/45, 46, 48, 50, 63, 61; 23/61, 200, 154

[56] References Cited
UNITED STATES PATENTS

| 785,312 | 3/1905 | Langley ...................... | 210/50 |
| 1,254,009 | 1/1918 | Hughes et al. ................ | 23/61 |
| 1,310,382 | 7/1919 | Auld et al. .................... | 210/45 |
| 1,824,936 | 9/1931 | Travers ........................ | 23/200 |
| 2,692,229 | 10/1954 | Heise et al. .................... | 210/50 |
| 2,810,633 | 10/1957 | Cooper.......................... | 210/45 X |
| 3,156,644 | 11/1964 | Kunin........................... | 210/26 X |
| 3,516,931 | 6/1970 | Birch............................ | 210/61 X |

FOREIGN PATENTS

| 1,030,265 | 5/1958 | Germany..................... | 210/50 |

Primary Examiner—Michael Rogers
Attorneys—Ernest S. Cohen and Roland H. Shubert

ABSTRACT: Ferrous iron-containing acid waste waters are neutralized to form a dense, compact, and easily settleable sludge. Ferrous to ferric iron ratios are adjusted prior to neutralization by catalytic oxidation to conform approximately to that of magnetite; 1$Fe^{++}$ to 2$Fe^{+++}$. Neutralization of the acid waste and precipitation of a mixed valence iron oxide is accomplished using a finely divided limestone slurry as the preferred neutralizing agent.

ALLEN CYWIN
EDWARD A. MIHOK

BY *Ernest S. Cohen*
*Roland H. Shubert*
ATTORNEYS

3,617,562

NEUTRALIZATION OF FERROUS IRON-CONTAINING ACID WASTES

BACKGROUND OF THE INVENTION

As antipollution standards become increasingly strict, one important problem faced by a number of industries has been the disposal of acid waste waters. To compound the problem, most acid waste waters carry dissolved metal salts; particularly iron salts such as the sulfate and chloride. Typical of such acid wastes are pickle liquors, pickle rinse waters, and acid mine drainage waters.

There are three major approaches to disposal; deep well disposal, regeneration, and neutralization. Use of deep wells for disposal purposes is dependent upon the local geology and cannot be considered a general solution to the problem. Regeneration is possible in most instances but has seldom proved to be economically feasible. At this time, neutralization is the most practical approach.

In neutralizing acid wastes, there are only two economic options: lime or limestone neutralization. Other alkaline materials, such as those containing sodium, potassium, and ammonium, will effectively neutralize acid wastes but they are expensive and often yield soluble salts which are in turn pollutants.

Another problem faced in any neutralization process is the disposal of sludges produced in the neutralization. These sludges, comprising generally hydrous metal oxides, are often bulky and hard to dewater. Ferrous hydroxide, one of the major sludge components produced in most neutralization processes, is particularly bad. It forms a slimy, gelatinous precipitate; slow to settle and hard to filter.

It has been recognized that the volume and characteristics of sludges formed upon neutralization are dependent upon a number of factors. Some of these factors include the choice of alkaline agent, temperature, acid concentration and the oxidation state of dissolved metal salts; particularly iron. For example, the advantages of finely pulverized limestone neutralization of acid mine drainage to produce a low volume, easy settling sludge is set out in Bureau of Mine, Report of Investigations, No. 7191 (1968).

In order to meet water quality standards, it is necessary that effluents discarded into surface waters have a pH above about 6 and be essentially free of heavy metal salts. When neutralizing ferrous iron-containing acid wastes, considerable difficulty is experienced in meeting those standards, especially when using limestone as a neutralizing agent. While ferric iron will be substantially completely precipitated as the hydrous oxide at a pH of about 4, ferrous iron will remain in solution until a much higher pH is reached. A pH of about 7.5 to 8 is required to complete the precipitation of hydrous ferrous oxide.

When using limestone as a neutralizing agent, carbon dioxide is released; a portion of which remains dissolved in the water to form carbonic acid. Dissolved carbon dioxide limits the pH attainable in limestone neutralization to a level of about 5 to 6. By air-stripping carbon dioxide from the neutralized solution in the presence of excess limestone, it is possible to eventually raise the pH to about 8.4 at which point the solution is in equilibrium with carbon dioxide in the air. However, during this stripping step, ferrous iron is oxidized to the ferric state, thus releasing an additional equivalent of acidity for each equivalent of ferrous iron oxidized. Neutralization of this additional acidity requires additional amounts of base and tends to be a rather slow reaction as well.

SUMMARY OF THE INVENTION

It has now been found that many of the inherent disadvantages of previous limestone neutralization processes may be overcome by precipitating dissolved iron in acid wastes as a ferrous-ferric oxide. The ratio of ferric iron to ferrous iron is adjusted prior to neutralization to approximately 2:1, thus conforming to the ratio present in magnetite. Ferrous iron may be quickly oxidized to the ferric state in acid solution using air as an oxidant at ambient temperatures over an activated carbon catalyst. The mixed valence iron is coprecipitated without additional oxidation to form a dense, granular sludge.

Hence, it is an object of this invention to neutralize ferrous iron-containing acid waste waters.

It is another object of this invention to produce an iron oxide sludge of greater density and better settling characteristics than that obtainable using conventional processes.

A further object of this invention is to reduce consumption of neutralizing agents.

DETAILED DESCRIPTION OF THE INVENTION

Figure 1:
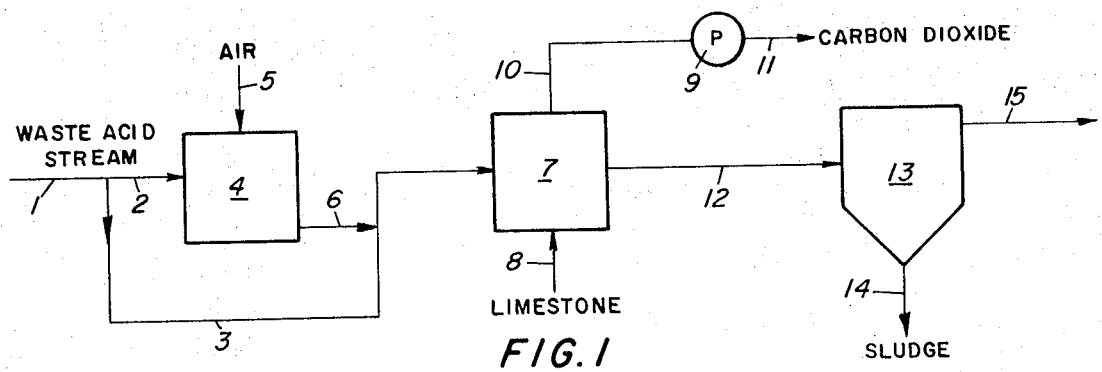
Figure 2:
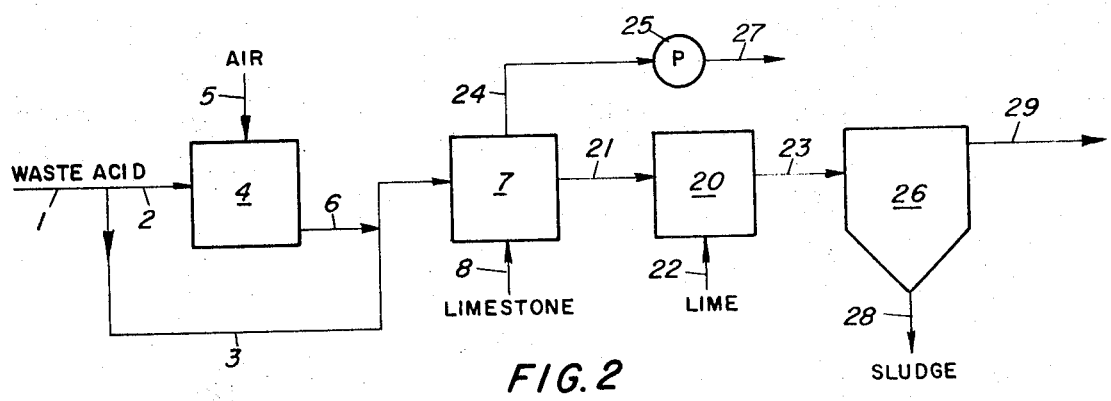
Figure 3:
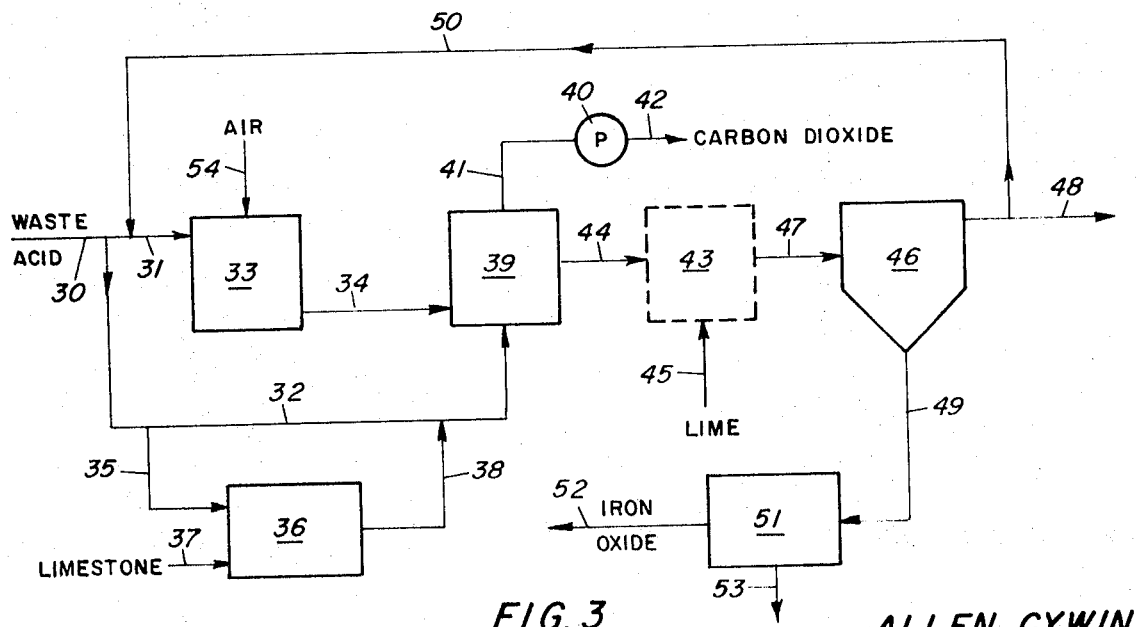

The invention will be more clearly understood by reference to the accompanying drawings in which:

FIGS. 1 to 3 are diagrammatic flowsheets illustrating possible variations of our process. The flowsheet set out in FIG. 3 is especially adapted for the neutralization of high-iron acid wastes such as pickle liquors.

Referring now to FIG. 1, an acid waste stream 1 containing substantial amounts of ferrous iron is divided into two portions, 2 and 3. Stream 2 is passed into reactor 4 where ferrous iron is oxidized to the ferric state. Reactor 4 may be of any conventional type suitable for the contacting of a solid catalyst with a liquid and gas stream. Preferably reactor 4 comprises a contacting tower packed with catalytic material. Granular, activated carbon has been found to be desirable for use as the catalyst.

A stream of oxidizing gas 5, preferably air, is passed into the reactor along with the acid stream. The air and acid streams may contact the catalyst in either a cocurrent or countercurrent fashion. An oxidized, ferric iron stream is removed from the reactor via conduit means 6 and is merged with ferrous iron-containing stream 3 to form a combined stream having a ferric to ferrous ion molar ratio of approximately 2:1. Ratio of ferric to ferrous iron is controlled by proportioning the flow of stream 2 relative to stream 3, by controlling the amount of oxidant introduced into reactor 4, by controlling contact time of the acid stream and oxidizing gas within the reactor or by any combination of these methods.

The combined stream is then passed into mixer-contactor 7 where neutralization occurs by reaction with a neutralizing agent introduced via conduit means 8. Neutralizing agent 8 is an alkaline material in solution or slurry form. A preferred neutralizing agent is a slurry of very finely divided limestone having a size range such that substantially all particles will pass a 400-mesh screen and having a median particle size of less than about 10 microns. A limestone slurry meeting these requirements may be generated by autogenous grinding in the manner described in copending, commonly assigned application Ser. No. 9249 filed on Sept. 17, 1969. Limestone slurries produced in this manner react in an extremely rapid and complete manner with acid wastes.

Mixer 7 may be of any conventional type which provides thorough mixing and contact between the acid waste and neutralizing agent streams. It is preferred that mixer 7 be a closed contacting vessel having agitation means such as a turbine mixer. During neutralization with limestone, carbon dioxide produced by the reaction limits the pH to a level below that at which ferrous oxides form. Hence, in order to obtain precipitation of a mixed ferrous-ferric oxide, it is necessary to remove carbon dioxide from the neutralization vessel. Carbon dioxoide may readily be removed from the neutralization vessel by either gas stripping or by vacuum means. If gas stripping is used, then the gas must have a low carbon dioxide content and be otherwise inert or nonreactive toward the process stream. Ordinarily, air would be satisfactory for use in stripping carbon dioxide but air stripping also oxidizes ferrous iron to ferric state thus defeating many of the advantages of our process.

It is preferred that carbon dioxide be removed from the neutralization reaction by drawing a vacuum on the mixer vessel. This may be accomplished by means of vacuum pump 9 which communicates with an upper portion of the neutralization vessel by means of conduit 10. Carbon dioxide, other dissolved gases and water vapor are discharged from the pump via conduit 11. Other conventional vacuum-producing devices such as stream eductor nozzles may be used in place of pump 9. A sufficiently strong vacuum is pulled on the neutralization vessel to produce a pH greater than about 7 in effluent stream 12 so that substantially all of the ferrous iron is precipitated.

Effluent stream 12, containing suspended, coprecipitated ferrous and ferric oxides, is then passed into clarifying means 13. Means 13 may comprise a conventional clarifying vessel, a filter or centrifuge, or may be simply a settling pond. A sludge portion 14 and a neutral waste water stream 15, suitable for disposal in surface waters, are recovered as products from the clarifying step. FIG. 2 illustrates another variation of the disclosed process. Elements 1 through 8 are identical to the like elements described in the discussion of FIG. 1. In this variant, all free acid is neutralized and ferric iron is precipitated in mixer 7 using a limestone slurry. Like in FIG. 1, carbon dioxide may be stripped from mixer 7 by means of vacuum-producing device 25 which communicates with an upper portion of the mixing vessel by means of conduit 24. Carbon dioxide is expelled from device 25 via exit line 27. Effluent from mixer 7, having a pH on the order of 4 to 6 or more, is passed to a second mixer vessel 20 by means of conduit 21. There a second neutralizing agent, preferably lime, is added to complete the neutralization and raise the pH to a level at which ferrous iron precipitates. It is preferred that the carbon dioxide removal from mixer 7 be as complete as practical in order to avoid excessive lime use by neutralization of carbon dioxide acidity. Since calcium carbonate is the product of such a neutralization, not only does lime neutralization of carbon dioxide require additional amounts of neutralizing agent but adds materially to the sludge load as well. From vessel 20, the neutralized reaction mixture is passed to clarifying means 26 by way of conduit means 23 to yield a sludge stream 28 and a waste water stream 29.

Turning now to FIG. 3, there is shown a variation of the process especially adapted for use in neutralizing concentrated ferrous iron wastes exemplified by spent pickle liquor. A waste stream 30 is split into two portions 31 and 32, stream 31 being passed into catalytic oxidation means 33 where ferrous iron is oxidized by air supplied via conduit 54. Stream 32 bypasses the oxidation reactor and is eventually merged with the product stream 34 from the oxidation step. Flow is proportioned between streams 31 and 32 so that merged stream 34 contains a ferrous to ferric iron ratio of substantially 1:2. Since substantially complete oxidation of ferrous to ferric iron may be accomplished within a short contact time, somewhat over two-thirds of the acid waste stream will normally be passed through the oxidation reactor.

In a preferred mode, bypass stream 32 is again split and a minor portion of its flow is passed via conduit 35 through autogenous grinding means 36. Coarsely crushed limestone is fed into the grinding means or mill via feed means 37 to produce a very finely divided limestone slurry. Details of this technique and engineering data is found in R. I. 7191. Slurry produced in the grinding step may be then merged with stream 32 by means of line 38. As well as being a convenient method of generating a limestone slurry of desirable characteristics, there is some indication that iron oxide precipitation nuclei are also formed which aid in the production of a dense precipitate during later neutralization.

Stream 32, now carrying limestone slurry, is passed together with stream 34 into mixer vessel 39 where neutralization of free acid and substantial precipitation of iron oxide occurs. Carbon dioxide released by the reaction is removed from mixer 39 preferably by means of vacuum-producing device 40 which communicates with an upper portion of the mixer by way of conduit 41. Carbon dioxide, other dissolved gases and water vapor are discharged via line 42.

Typically, waste pickle liquor is discharged from the process at the temperature of the pickling bath, usually about 180° F. It is of great advantage in this particular embodiment of our invention to carry out the neutralization step at, or close to, waste liquor discharge temperatures. Solubility of carbon dioxide in aqueous solution, like other dissolved gases, is highly temperature dependent. For example, solubility of carbon dioxide in aqueous solution at 180° F. is about 20 percent that which is displayed at room temperature. This phenomenon has far-reaching significance in our process since the pH obtainable at equilibrium with limestone raises from the 5 to 6 level observed at room temperature to a pH of 7.5, which is sufficient to substantially completely precipitate ferrous iron, is then easily attained by application of a moderate vacuum to the mixer vessel. In this embodiment, a steam or air-powered eductor nozzle or a centrifugal-type compressor are well suited for use as the vacuum producing means.

A second substantial advantage growing out of neutralization at high temperatures is that a dense, black, magnetic sludge develops at these conditions. Development of magnetic iron oxides is temperature dependent; the reaction proceeding rapidly and apparently to substantial completion at temperatures on the order of 180° F. or above. Magnetic properties are developed, at least to some degree, at temperatures as low as about 150° F. but little if any conversion to magnetic forms occurs at room temperature. Even at room temperature, however, the mixed ferrous-ferric oxide precipitate is denser and more easily filtered or settled than is the sludge from a conventional neutralization process.

Reaction effluent from mixer 39 containing substantial amounts of precipitated iron oxides may then optionally be passed to a second-stage neutralization mixer vessel 43 via line 44. Use of a second-stage neutralization vessel is advantageous when the waste acid stream is at relatively low temperatures or ambient condition. If the waste acid stream is at relatively high temperatures, a single-stage neutralization is preferred. A stronger base than limestone, preferably lime, is used as the neutralizing agent in the second stage. Sufficient base is added to second-stage neutralizing vessel 43, via conduit 45, to raise the pH to the desired level, usually between 7 and 8.

Fully neutralized effluent is then passed to clarifying means 46 by way of line 47. A solid-free liquid stream 48 and a sludge fraction 49 are recovered from the clarifying means. In some cases where the acid waste stream is highly concentrated, it is advantageous to dilute it somewhat before neutralization. Dilution may readily be accomplished by recycling a portion of stream 48 back to the incoming waste stream 30 by way of line 50.

If the mixed-valence iron oxide precipitate has a ratio of ferrous to ferric iron corresponding closely to 1 to 2 and in neutralized at relatively high temperatures, then the precipitated oxide displays significant magnetic properties as well as being in a granular, dense and easily settable form. Separation of an iron oxide concentrate, suitable for sintering and recycle as an iron ore, may be accomplished in separation means 51. An iron oxide fraction 52 and a gangue fraction 53 may be recovered by standard metallurgical techniques such as magnetic separation or flotation. In the case of acid wastes primarily in the sulfate form, gangue material 53 will comprise primarily calcium sulfate together the inert materials present in the limestone used as the neutralizing agent. When the acid wastes are in the chloride form, gangue material will comprise essentially limestone inerts while clarified liquid stream 48 will be rich in dissolved calcium chloride. In this latter case, stream 48 may be treated with sulfuric acid to precipitate calcium sulfate and produce hydrochloric acid as is well know.

In all embodiments of the invention, it is preferred to add limestone in slight excess; on the order to 2 to 10 percent greater quantities than is required by stoichiometric considerations. Limestone in greater excess contributes little to the speed of the neutralization process and increases the amount of sludge to be purified or otherwise disposed of.

Activity of the activated carbon catalyst will vary depending upon its porosity, surface area and activation procedure.

Commercially available, granular, coal-base activated carbons, such as Pittsburgh Activated Carbon CP6 ( 8×30 mesh), were found to be satisfactory for use in the process. It was also found that a catalyst preconditioning step substantially increased its activity. This preconditioning step comprised acid treatment of the catalyst for a period of time ranging from a few hours to a few days. Acid used in the preconditioning may conveniently comprise the acid waste stream being treated and may be carried out at ambient conditions.

Contact time to achieve substantially complete conversion of ferrous to ferric iron varies with the concentration of the solution, activity of the catalyst and amount of free acid present. For example, the ferrous iron content of an acid mine drainage water having a total acidity of about 2,400 p.p.m. and a dissolved solids content of about 7,000 p.p.m. was reduced from about 700 to about 10 p.p.m. in less than 1 minute reaction time at room temperature. It is preferred that the reaction be carried out in a packed column as a three-phase system using air as the oxidizing agent. Liquid flow rates through the carbon column generally can vary within the range of about 1 to about 20 gallons per square feet of catalyst cross-sectional area per minute. Flow rates within the range of about 5-10 gallons per square feet per minute resulted in substantially complete oxidation of ferrous iron contained in acid mine water. Acid waste waters oxidized in this manner should be relatively free of suspended solids and oils to avoid plugging the column or reducing its catalytic activity. It is preferred that the reactant air be introduced in stoichiometric excess based upon a complete oxidation of ferrous to ferric iron.

As has been set out previously, oxidation of ferrous iron to the ferric state releases one equivalent of acidity for each equivalent of iron oxidized. Hence, our process results in a significant savings of neutralizing agent since not all of the iron is oxidized. Furthermore, this advantage is cumulative to other enumerated advantages such as denser and more easily settleable sludge and use of a cheap, easily prepared neutralizing agent.

It is evident that other minor modifications in our disclosed process will be obvious to practitioners in the art. For example, in waste streams carrying a very high concentration of free acid, a partial neutralization step may be used prior to the catalytic oxidation step. This is especially advantageous in chloride-containing waste acid streams using a limestone neutralizing agent as has been previously described.

What is claimed is:

Claim 1. A process for neutralizing acid waste streams containing dissolved iron salts, a substantial portion of said iron salts being in the ferrous oxidation state, which comprises
catalytically oxidizing at least a portion of the ferrous iron contained in the waste stream to the ferric state without neutralization of free acid contained in the waste stream and thereafter
contacting the oxidized waste stream with at least about a stoichiometric quantity of an alkaline agent to neutralize free acid, and
to precipitate a mixed ferrous-ferric iron oxide.

2. The process of claim 1 wherein at least a part of the alkaline agent comprises limestone and wherein dissolved carbon dioxide is removed from the free-acid-neutralized waste stream without substantial further oxidation of the contained ferrous iron.

3. The process of claim 2 wherein carbon dioxide is removed by stripping the waste stream with an inert gas, said gas being substantially free of oxygen and carbon dioxide.

4. The process of claim 2 wherein carbon dioxide is removed by applying a vacuum to the waste stream.

5. The process of claim 2 wherein the ferrous to ferric iron ratio in the waste stream after oxidation is adjusted to a mole ratio of about 1:2.

6. The process of claim 5 wherein ferrous iron contained in the waste stream is oxidized in contact with a catalytically-active activated carbon.

7. The process of claim 6 wherein the activated carbon catalyst is conditioned prior to the oxidation step by contacting said carbon catalyst with acid solution.

8. The process of claim 7 wherein substantially all free acid is neutralized in a first stage using limestone as a neutralizing agent to produce an effluent having a pH in the rage of about 4 to about 6 and wherein the pH of said effluent is raised to a level in the range of about 7 to about 8 in a second state using a strong base as a neutralizing agent in said second stage.

9. The process of claim 8 wherein said strong base is lime.

10. The process of claim 7 wherein the limestone is in a very finely divided state; the median limestone particle diameter being less than about 10 microns.

11. The process of claim 10 wherein said finely divided limestone is produced by autogeneous grinding.

12. The process of claim 11 wherein the acid waste stream comprises pickle liquor.

13. The process of claim 12 wherein said pickle liquor is a temperature above about 150° F. and wherein carbon dioxide is removed from the limestone neutralization step by application of a vacuum to said neutralized waste stream.

14. The process of claim 13 wherein said applied vacuum removes sufficient dissolved carbon dioxide to raise the pH of the neutralized effluent to above about 7 thereby precipitating substantially all of the dissolved ferrous iron.

15. The process of claim 14 wherein an iron oxide precipitate having a composition approximating that of magnetite is separated from the neutralized waste stream.

16. The process of claim 15 wherein said pickle liquor comprises hydrochloric acid pickle liquor, wherein said neutralized waste stream contains substantial amounts of calcium chloride and wherein hydrochloric acid is regenerated by treating said neutralized waste stream with sulfuric acid.

* * * * *